(12) United States Patent
Park et al.

(10) Patent No.: US 8,218,016 B2
(45) Date of Patent: Jul. 10, 2012

(54) IMAGE STABILIZATION MECHANISM FOR CAMERA MODULE

(75) Inventors: Chuel Jin Park, Gyunggi-do (KR); Chul Yeub Han, Gyunggi-do (KR); Soo Cheol Lim, Gyunggi-do (KR); Jae Hyuk Park, Seoul (KR); Dong Kyun Lee, Seoul (KR)

(73) Assignee: Samsung Electro-Mechanics Co., Ltd, Suwon, Gyunggi-Do (KR)

( * ) Notice: Subject to any disclaimer, the term of this patent is extended or adjusted under 35 U.S.C. 154(b) by 293 days.

(21) Appl. No.: 12/646,866

(22) Filed: Dec. 23, 2009

(65) Prior Publication Data
US 2011/0109968 A1 May 12, 2011

(30) Foreign Application Priority Data
Nov. 10, 2009 (KR) .................. 10-2009-0108207

(51) Int. Cl.
*G02B 27/64* (2006.01)
(52) U.S. Cl. .............. 348/208.11; 396/55; 359/557
(58) Field of Classification Search .......... 359/554–557; 348/208.99, 208.1–208.16; 396/52–55
See application file for complete search history.

(56) References Cited

U.S. PATENT DOCUMENTS

| | | | | |
|---|---|---|---|---|
| 5,842,053 A * | 11/1998 | Ueyama et al. | ................. | 396/55 |
| 6,047,135 A * | 4/2000 | Hamada | .................. | 396/55 |
| 6,114,799 A * | 9/2000 | Yoshida et al. | ................ | 310/328 |
| 6,226,459 B1 * | 5/2001 | Hamada et al. | ................. | 396/54 |
| 7,372,190 B2 * | 5/2008 | Manabe | ........................ | 310/328 |
| 7,471,886 B2 * | 12/2008 | Hirota et al. | .................... | 396/52 |
| 7,579,751 B2 * | 8/2009 | Harada et al. | ............ | 310/323.17 |
| 7,652,407 B2 * | 1/2010 | Nishiyama et al. | ........... | 310/310 |
| 2005/0259156 A1 * | 11/2005 | Kosaka et al. | ............. | 348/208.7 |
| 2007/0132855 A1 * | 6/2007 | Inoue et al. | ............. | 348/208.99 |
| 2008/0080052 A1 * | 4/2008 | Suzuki | ........................ | 359/554 |
| 2010/0039718 A1 * | 2/2010 | Nishimiya et al. | ........... | 359/824 |
| 2011/0102665 A1 * | 5/2011 | Takei | ........................... | 348/373 |

FOREIGN PATENT DOCUMENTS

| | | | | |
|---|---|---|---|---|
| JP | 2004148474 A | * | 5/2004 | |
| JP | 2005-187996 | | 1/2007 | |
| JP | 2008197220 A | * | 8/2008 | |
| JP | 2008268498 A | * | 11/2008 | |

* cited by examiner

*Primary Examiner* — Mark Consilvio
(74) *Attorney, Agent, or Firm* — Blakely Sokoloff Taylor & Zafman LLP

(57) ABSTRACT

Disclosed herein is an image stabilization mechanism for a camera module. The image stabilization mechanism includes a base, a movable stage receiving a lens barrel therein and having a magnet, and a piezoelectric actuator. The piezoelectric actuator is installed to the base, moves the movable stage in an X-axis or Y-axis direction to remove shake of the lens barrel, and maintains contact with the movable stage because of magnetic attractive force between the piezoelectric actuator and the magnet. The image stabilization mechanism reduces the number of components, thus simplifying the structure and minimizing an increase in height.

9 Claims, 5 Drawing Sheets

IMAGE STABILIZATION MECHANISM FOR CAMERA MODULE

CROSS REFERENCE TO RELATED APPLICATION

This application claims the benefit of Korean Patent Application No. 10-2009-0108207, filed on Nov. 10, 2009, entitled "Image Stabilization Mechanism Of Camera Module", which is hereby incorporated by reference in its entirety into this application.

BACKGROUND OF THE INVENTION

1. Technical Field

The present invention relates to an image stabilization mechanism for a camera module.

2. Description of the Related Art

Recently, a variety of camera modules including a video camera, a still camera, and a camera unit installed in a portable electronic apparatus such as a mobile phone are equipped with an image stabilization mechanism to compensate for image blurring caused by a camera body shake.

The image stabilization mechanism includes a lens driving mechanism, an imaging device driving mechanism, and an electronic compensation mechanism. When an image leans in the direction perpendicular to the optical axis due to the tilting of the optical axis resulting from camera shake, the lens driving mechanism temporarily moves some lenses (or lens group) constituting a lens system in a direction perpendicular to the optical axis to change the optical path of the lenses (compensation lens), thus forming the image of a subject at a predetermined position on an image formation surface. The imaging device driving mechanism moves an imaging device so that an image formation position deviating because of camera shake becomes a predetermined image formation position. The electronic compensation mechanism compensates for the deviation of an image formation position due to camera shake with electronic manipulation.

The lens driving mechanism or the imaging device driving mechanism needs to move the compensation lens or the imaging device in the two directions (X-axis direction and Y-axis direction) which are perpendicular to the optical axis. To this end, an image stabilization mechanism of patent document 1 has been proposed.

The image stabilization mechanism 50 according to the patent document 1 includes a base plate 52, an X-axis direction slide 54X for sliding the image of the base plate 52 in the X-axis direction, a Y-axis direction slide 54Y for sliding the image of the X-axis direction slide 54X in the Y-axis direction, an X-axis direction actuator 56X for driving the X-axis direction slide 54X, and a Y-axis direction actuator 56Y for driving the Y-axis direction slide 54Y.

However, the image stabilization mechanism disclosed in patent document 1 is problematic in that it includes the X-axis direction slide 54X and the Y-axis direction slide 54Y, so that the number of required parts is large and thereby the structure is complicated. Further, the X-axis direction slide 54X and the Y-axis direction slide 54Y are not independent of each other, and the Y-axis direction slide 54Y is arranged above the X-axis direction slide 54X such that the X-axis direction slide 54X and the Y-axis direction slide 54Y are dependently driven, so that the height of the image stabilization mechanism in the Z-axis direction is undesirably increased. These problems increase cost, make it difficult to miniaturize the image stabilization mechanism, and reduce in positioning accuracy.

[Patent Document 1] Japanese Patent Laid-Open Publication No. 2007-010730

SUMMARY OF THE INVENTION

The present invention has been made in an effort to provide an image stabilization mechanism for a camera module, which reduces the number of components, thus simplifying the structure and minimizing an increase in height.

In an image stabilization mechanism for a camera module according to an embodiment of the present invention, a base is provided. A movable stage receives a lens barrel therein, and has a magnet. A piezoelectric actuator is installed to the base, moves the movable stage in an X-axis or Y-axis direction to remove shake of the lens barrel, and maintains contact with the movable stage because of magnetic attractive force between the piezoelectric actuator and the magnet.

The base may include on an edge thereof a guide part to support and guide the movable stage.

The base may include on an edge thereof a support part to support the piezoelectric actuator.

Further, the piezoelectric actuator may include an X-axis piezoelectric actuator which is arranged on an edge of the base extending in the X-axis direction and moves the movable stage in the X-axis direction, and a Y-axis piezoelectric actuator which is arranged on an edge of the base extending in the Y-axis direction and moves the movable stage in the Y-axis direction.

Further, the piezoelectric actuator may include a weight. A piezoelectric vibrator may be provided on the weight to generate a drive force by extending or bending when power is applied to the piezoelectric vibrator. A friction rod may be provided on the piezoelectric vibrator to transmit the drive force from the piezoelectric vibrator to the movable stage, with magnetic attractive force acting between the friction rod and the magnet.

The image stabilization mechanism may further include a compression spring which presses the movable stage towards the piezoelectric actuator to maintain contact of the movable stage with the piezoelectric actuator.

Further, the movable stage may have in a central portion thereof an internal opening to receive the lens barrel, with a step provided in the internal opening to support the compression spring.

The image stabilization mechanism may further include a casing which is fastened to the base to cover the movable stage and the piezoelectric actuator and presses the compression spring.

The image stabilization mechanism may further include a position detecting part which detects movement of the movable stage.

Further, the position detecting part may comprise a Hall sensor which is provided on an upper surface of the base to detect movement of the movable stage according to a change in magnetic flux of the magnet.

The image stabilization mechanism may further include a control unit which calculates a drive position of the movable stage based on positional data of the movable stage transmitted from the position detecting part, and controls power applied to the piezoelectric actuator according to the drive position.

DESCRIPTION OF THE PREFERRED EMBODIMENTS

Figure 1:
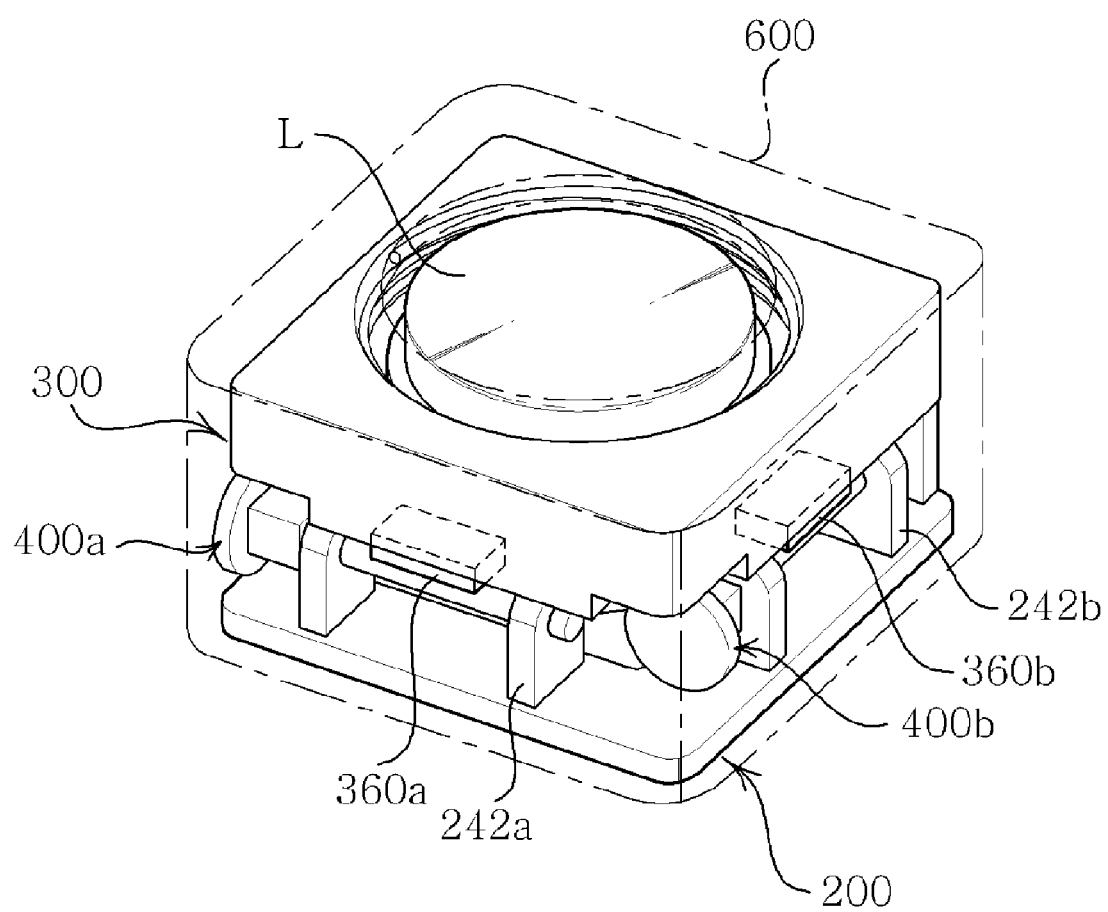
FIG. 1 is a perspective view illustrating the assembled state of an image stabilization mechanism for a camera module according to a preferred first embodiment of the present invention.

Various objects, advantages and features of the invention will become apparent from the following description of embodiments with reference to the accompanying drawings.

The terms and words used in the present specification and claims should not be interpreted as being limited to typical meanings or dictionary definitions, but should be interpreted as having meanings and concepts relevant to the technical scope of the present invention based on the rule according to which an inventor can appropriately define the concept of the term to describe most appropriately the best method he or she knows for carrying out the invention.

The above and other objects, features and advantages of the present invention will be more clearly understood from the following detailed description taken in conjunction with the accompanying drawings. Herein, the same reference numerals are used throughout the different drawings to designate the same components. Further, when it is determined that the detailed description of the known art related to the present invention may obscure the gist of the present invention, the detailed description will be omitted.

Hereinafter, the preferred embodiments of the present invention will be described in detail with reference to the accompanying drawings.

Image Stabilization Mechanism for Camera Module

First Embodiment

Figure 2:
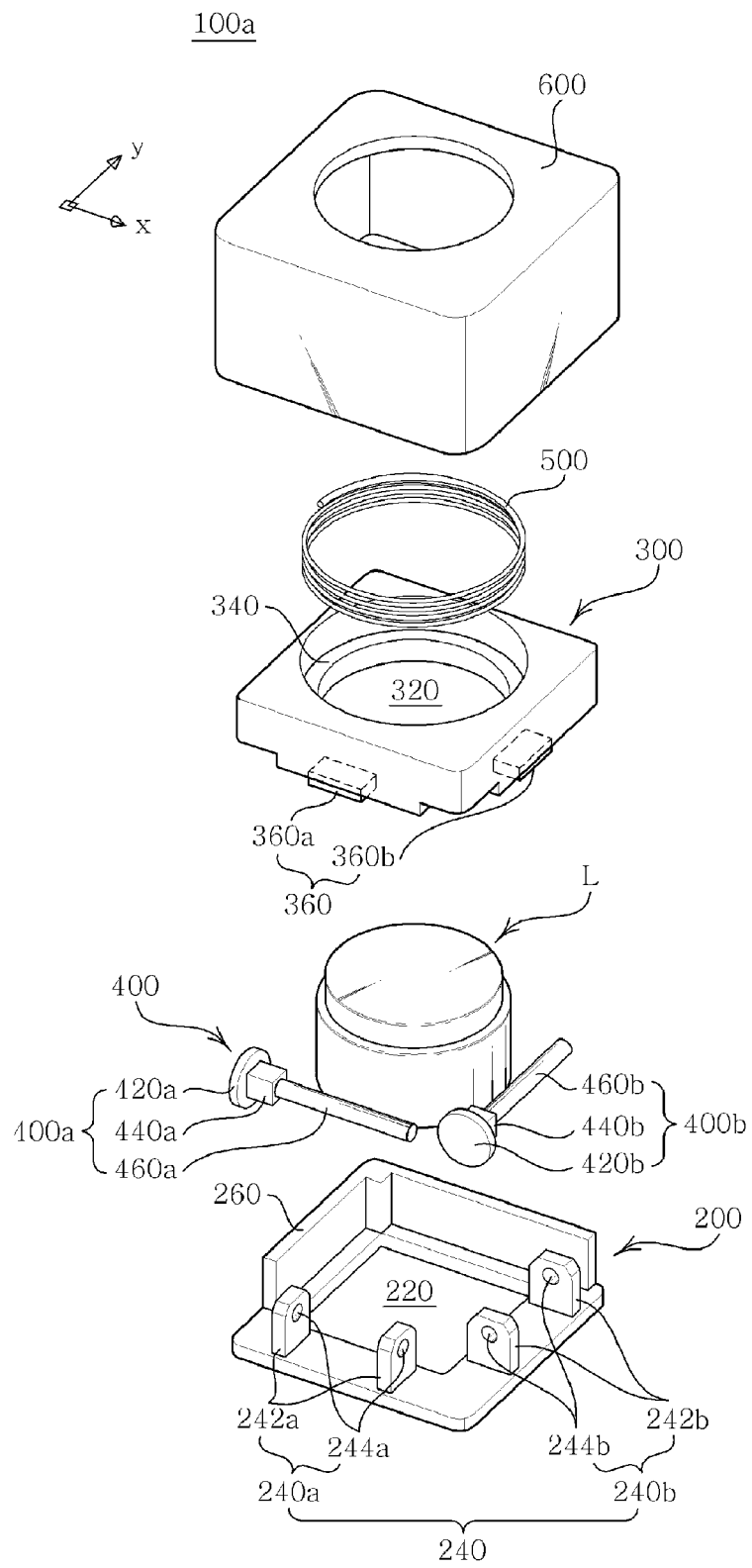
FIG. 2 is an exploded perspective view illustrating the image stabilization mechanism for the camera module of FIG. 1.
Figure 3:
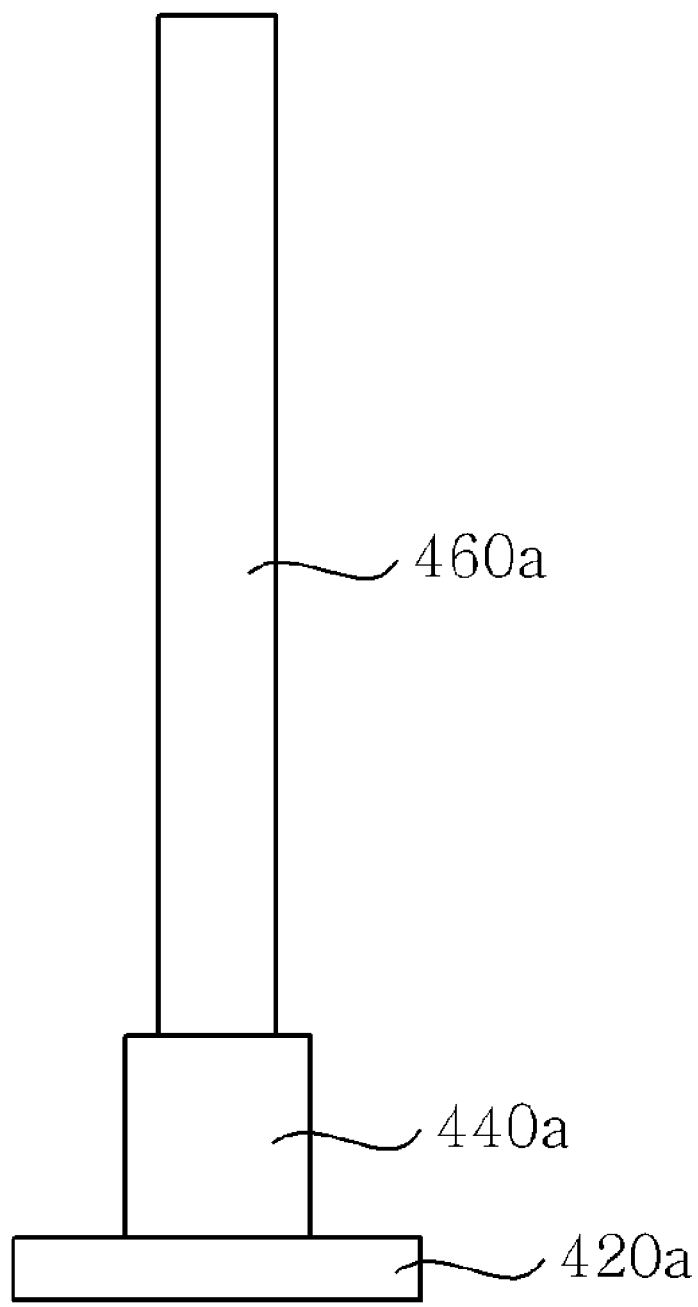
FIG. 3 is a plan view illustrating a piezoelectric actuator of FIG. 1.

FIG. 1 is a perspective view illustrating the assembled state of an image stabilization mechanism for a camera module according to a preferred first embodiment of the present invention, FIG. 2 is an exploded perspective view illustrating the image stabilization mechanism for the camera module of FIG. 1, and FIG. 3 is a plan view illustrating a piezoelectric actuator of FIG. 1. Hereinafter, the image stabilization mechanism 100a for the camera module according to this embodiment will be described with reference to the accompanying drawings.

As shown in FIGS. 1 to 3, the image stabilization mechanism 100a for the camera module according to this embodiment includes a base 200, a movable stage 300, and a piezoelectric actuator 400.

The base 200 functions to support the components of the image stabilization mechanism, and has the shape of a plate which has in the central portion thereof an internal opening 220, so that a lens barrel L passes through the internal opening 220.

Further, the base 200 includes a support part 240 for supporting the piezoelectric actuator 400 on an upper surface of the support part 240, that is, an X-axis support part 240a for supporting an X-axis actuator 400a and a Y-axis support part 240b for supporting a Y-axis actuator 400b. Here, the X-axis actuator 400a is provided on an edge of the base 200 extending in the X-axis direction. At least one vertical plate 242a is erected on the upper surface of the base 200 and provided with a through hole 244a so that the X-axis actuator 400a is inserted into the through hole 244a. Further, the Y-axis actuator 400b is provided on an edge of the base 200 extending in the Y-axis direction. At least one vertical plate 242b is erected on the upper surface of the base 200 and provided with a through hole 244b so that the Y-axis actuator 400b is inserted into the through hole 244b. The X-axis support part 240a and the Y-axis support part 240b are provided on two edges meeting at one corner (a vertex) of the base 200 in such a way as to be perpendicular to each other.

Further, the base 200 has on an upper surface thereof a guide part 260 to prevent the movable stage 300 from tilting. Here, the guide part 260 may be vertically erected up on other edges of the base 200 having no support part 240, that is, may have a vertical sidewall structure.

The movable stage 300 functions to remove the shake of the lens barrel L while moving in a direction which removes the shake. The movable stage 300 has the shape of a plate which has in the central portion thereof an internal opening 320.

The lens barrel L serving as a lens receptor which receives at least one lens arranged along an optical axis is received in the movable stage 300. As the movable stage 300 moves, the lens barrel L also moves. Further, a step 340 may be provided in the internal opening 320 of the movable stage 300 to support a compression spring 500 which will be described later.

Meanwhile, a magnet 360 is provided on the lower surface of an edge of the movable stage 300 to maintain contact with the piezoelectric actuator 400 using magnetic attractive force. The magnet 360 includes an X-axis magnet 360a provided on an edge extending in an X-axis direction of the movable stage 300, and a Y-axis magnet 360b provided on an edge extending in a Y-axis direction of the movable stage 300.

The piezoelectric actuator 400 functions to move the movable stage 300 in a direction which removes the shake of the lens barrel L. The piezoelectric actuator 400 is made of a material which applies magnetic attractive force to the magnet 360, thus maintaining contact with the movable stage 300, and transmits a generated drive force to the movable stage 300.

Here, the piezoelectric actuator 400 includes the X-axis piezoelectric actuator 400a which is arranged on the edge extending in the X-axis direction of the base 200, thus moving the movable stage 300 in the X-axis direction, and the Y-axis piezoelectric actuator 400b which is arranged on the edge extending in the Y-axis direction of the base 200, thus moving the movable stage 300 in the Y-axis direction.

Each of the X-axis and Y-axis piezoelectric actuators 400a and 400b includes a piezoelectric vibrator 440a or 440b which generates drive force on a weight 420a or 420b, and a friction rod 460a or 460b which transmits drive force to the outside (see FIG. 3).

The piezoelectric vibrator 440a or 440b is extended or bent when power is applied to the piezoelectric vibrator 440a or 440b, thus generating drive force, and comprises a piezoelectric sheet (ceramic piezoelectric sheet) on which an electrode pattern is formed or laminated piezoelectric sheets. By appropriately determining the electrode pattern printed on the surface of the piezoelectric sheet, each of the piezoelectric vibrators 440a and 440b generates a first vibration mode and a second vibration mode, for example, a stretching vibration mode generated in the lengthwise direction of the piezoelectric vibrator 440a or 440b and a flexural vibration mode generated in the thickness direction of the piezoelectric vibrator 440a or 440b. However, the first and second vibration modes are not limited to the above-mentioned modes, but any mode is possible as long as it produces elliptic motion on the friction rod 460a or 460b which transmits drive force. Meanwhile, since various laminated structures and electrode pattern structures for the piezoelectric sheet of the piezoelectric vibrator 440a or 440b are widely known to those skilled in the art, a detailed description will be omitted herein.

Further, each friction rod 460a or 460b functions to transmit drive force from the piezoelectric vibrator 440a or 440b to the movable stage 300, and extends from one end of the piezoelectric vibrator 440a or 440b. Here, since the friction rod 460a or 460b is made of a material applying magnetic attractive force to the magnet 360 which is provided on the movable stage 300, the friction rod 460a or 460b maintains contact with the movable stage 300. Further, the friction rod 460a or 460b transmits drive force to the movable stage 300 contacting the friction rod 460a or 460b, thus moving the movable stage 300 in the X-axis or Y-axis direction.

Further, the weight 420a or 420b provides a predetermined mass to the other end of the piezoelectric vibrator 440a or 440b having no friction rod 460a or 460b, thus enabling drive force to be transmitted from the piezoelectric vibrator 440a or 440b to the friction rod 460a or 460b. The weight 420a or 420b is not limited to a specific shape, but may have a cylindrical or hexahedral shape.

Meanwhile, the compression spring 500 may be further provided to press the movable stage 300 towards the piezoelectric actuator 400, thus maintaining contact between the movable stage 300 and the piezoelectric actuator 400. Here, the compression spring 500 is supported by the step 340 which is provided in the movable stage 300. Further, the image stabilization mechanism may include a casing 600 which is fastened to the base 200 to cover the movable stage 300 and the piezoelectric actuator 400. The casing 600 presses the compression spring 500.

Image Stabilization Mechanism for Camera Module

Second Embodiment

Figure 4:
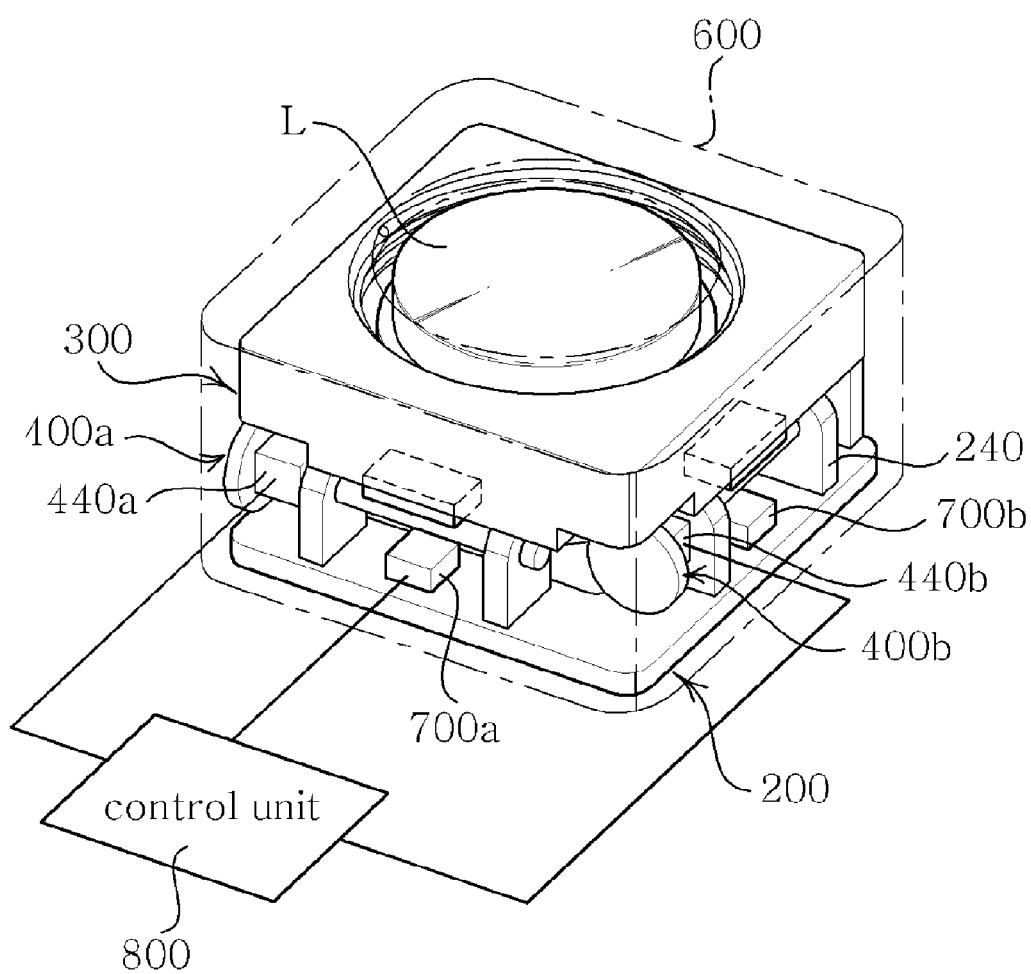
FIG. 4 is a perspective view illustrating the assembled state of an image stabilization mechanism for a camera module according to a preferred second embodiment of the present invention.
Figure 5:
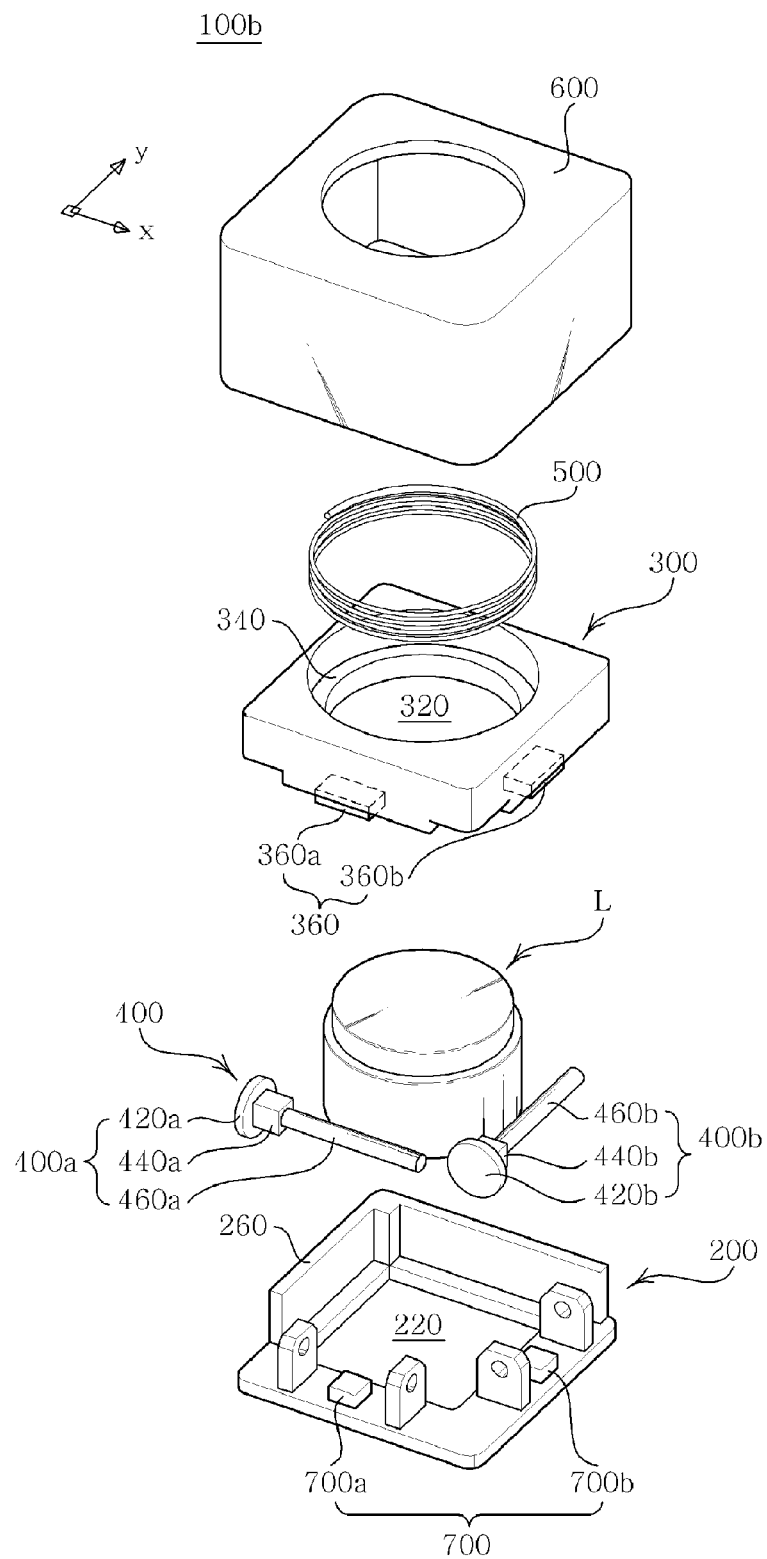
FIG. 5 is an exploded perspective view illustrating the image stabilization mechanism for the camera module of FIG. 4.

FIG. 4 is a perspective view illustrating the assembled state of an image stabilization mechanism for a camera module according to a preferred second embodiment of the present invention, and FIG. 5 is an exploded perspective view illustrating the image stabilization mechanism for the camera module of FIG. 4. Hereinafter, the image stabilization mechanism 100b for the camera module according to this embodiment will be described with reference to the accompanying drawings.

As shown in FIGS. 4 and 5, the image stabilization mechanism 100b for the camera module according to this embodiment may further include a position detecting part 700 and a control unit 800 in addition to the components of the image stabilization mechanism 100a for the camera module according to the first embodiment, thus realizing a feedback system. Since the image stabilization mechanism 100b of the second embodiment is equal to that of the first embodiment except for the position detecting part 700 and the control unit 800, those elements common to both embodiments will use the same reference numerals, and a repetitive description thereof will be omitted.

Here, the position detecting part 700 serves to detect the movement of the movable stage 300, that is, the movement in the X-axis direction and the Y-axis direction, and includes an X-axis position detecting part 700a and a Y-axis position detecting part 700b. The position detecting part 700 may use a Hall sensor which is provided on the upper surface of the base 200 and detects the movement of the movable stage 300 according to a change in magnetic flux of the magnet 360 which is provided on the movable stage 300. Here, the Hall sensor may be provided with an additional magnet to detect the magnetic flux. Such a construction also falls within the scope of the present invention.

The control unit 800 calculates the drive position (drive position for removing the shake of the lens barrel L) of the movable stage 300, based on positional data of the movable stage 300 transmitted from the position detecting part 700, and controls power applied to the piezoelectric vibrators 440a and 440b of the piezoelectric actuator 400 according to the calculated drive position, thus realizing a feedback system.

As described above, the present invention provides an image stabilization mechanism for a camera module, in which a movable stage is moved in the X- and Y-axis directions by a piezoelectric actuator, so that two slides are not required unlike the related art and thus the number of components may be reduced, thus realizing a simple structure. Further, it is not necessary to stack two slides, thus preventing an increase in height in a Z-axis direction.

Further, the present invention provides an image stabilization mechanism for a camera module, in which a movable stage is provided with a magnet, and the friction rod of a piezoelectric actuator is made of a material applying magnetic attractive force to the magnet, so that the contact of the movable stage with the piezoelectric actuator is simply maintained by the magnetic attractive force, thus enabling a drive force to be transmitted from the piezoelectric actuator to the movable stage. Moreover, the movable stage is pressed by a compression spring to be in contact with the piezoelectric actuator, thus maintaining a state of contact, therefore allowing a drive force to be reliably transmitted from the piezoelectric actuator.

Furthermore, the present invention provides an image stabilization mechanism for a camera module, in which a position detecting part detects the position of a movable stage, and a control unit controls the drive force of a piezoelectric actuator based on the detected result, thus realizing a feedback system, therefore providing an image stabilization function having improved reliability. Here, a Hall sensor is applied as the position detecting part, and the position of the movable stage is detected according to a change in magnetic flux of a magnet provided on the movable stage, thus achieving a detecting function without using an additional component.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

Accordingly, such modifications, additions and substitutions should also be understood to fall within the scope of the present invention.

What is claimed is:

1. An image stabilization mechanism for a camera module, comprising:
    a base;
    a movable stage receiving a lens barrel therein, and having a magnet;
    a piezoelectric actuator installed to the base to move the movable stage in an X-axis or Y-axis direction to diminish shaking of the lens barrel, the piezoelectric actuator maintaining contact with the movable stage because of magnetic attractive force between the piezoelectric actuator and the magnet; and, a compression spring pressing the movable stage towards the piezoelectric actuator to maintain contact of the movable stage with the piezoelectric actuator, wherein the movable stage comprises in a central portion thereof an internal opening to receive the lens barrel, with a step provided in the internal opening to support the compression spring.

2. The image stabilization mechanism as set forth in claim 1, wherein the base comprises on an edge thereof a guide part to support and guide the movable stage.

3. The image stabilization mechanism as set forth in claim 1, wherein the base comprises on an edge thereof a support part to support the piezoelectric actuator.

4. The image stabilization mechanism as set forth in claim 1, wherein the piezoelectric actuator comprises:
   an X-axis piezoelectric actuator arranged on an edge of the base extending in the X-axis direction, and moving the movable stage in the X-axis direction; and
   a Y-axis piezoelectric actuator arranged on an edge of the base extending in the Y-axis direction, and moving the movable stage in the Y-axis direction.

5. The image stabilization mechanism as set forth in claim 1, wherein the piezoelectric actuator comprises:
   a weight;
   a piezoelectric vibrator provided on the weight, and generating a drive force by extending or bending when power is applied to the piezoelectric vibrator; and
   a friction rod provided on the piezoelectric vibrator, transmitting the drive force from the piezoelectric vibrator to the movable stage, with magnetic attractive force acting between the friction rod and the magnet.

6. The image stabilization mechanism as set forth in claim 1 further comprising:
   a casing fastened to the base to cover the movable stage and the piezoelectric actuator, and pressing the compression spring.

7. The image stabilization mechanism as set forth in claim 1, further comprising:
   a position detecting part for detecting movement of the movable stage.

8. The image stabilization mechanism as set forth in claim 7, wherein the position detecting part comprises a Hall sensor which is provided on an upper surface of the base to detect movement of the movable stage according to a change in magnetic flux of the magnet.

9. The image stabilization mechanism as set forth in claim 7, further comprising:
   a control unit calculating a drive position of the movable stage based on positional data of the movable stage transmitted from the position detecting part, and controlling power applied to the piezoelectric actuator according to the drive position.

* * * * *